US010511799B2

(12) United States Patent
Hamasaki et al.

(10) Patent No.: US 10,511,799 B2
(45) Date of Patent: *Dec. 17, 2019

(54) SEMICONDUCTOR DEVICE AND IMAGE PROCESSING METHOD

(71) Applicant: Renesas Electronics Corporation, Tokyo (JP)

(72) Inventors: Hiroyuki Hamasaki, Tokyo (JP); Atsushi Nakamura, Tokyo (JP); Manabu Koike, Tokyo (JP); Hideaki Kido, Mito (JP); Nobuyasu Kanekawa, Hitachi (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,351

(22) Filed: Sep. 17, 2018

(65) Prior Publication Data

US 2019/0020849 A1    Jan. 17, 2019

Related U.S. Application Data

(63) Continuation of application No. 15/961,985, filed on Apr. 25, 2018, now Pat. No. 10,104,332, which is a
(Continued)

(30) Foreign Application Priority Data

Dec. 8, 2011 (JP) ................................ 2011-268705

(51) Int. Cl.
*H04N 5/77* (2006.01)
*H04N 5/265* (2006.01)
(Continued)

(52) U.S. Cl.
CPC ............... *H04N 5/77* (2013.01); *G06T 1/20* (2013.01); *G06T 1/60* (2013.01); *H04N 5/23229* (2013.01);
(Continued)

(58) Field of Classification Search
CPC ...... H04N 5/23229; H04N 5/265; G06T 1/20; G06T 1/60
See application file for complete search history.

(56) References Cited

U.S. PATENT DOCUMENTS 6,239,815 B1    5/2001  Frink et al.
6,437,825 B1    8/2002  Inuzuka et al.
(Continued)

FOREIGN PATENT DOCUMENTS

JP    02-51781 A    2/1990
JP    2827258 B2    9/1998
(Continued)

OTHER PUBLICATIONS

Office Action dated Jun. 2, 2015, in Japanese Patent Application No. 2011-268705.
(Continued)

*Primary Examiner* — Daniel M Pasiewicz
(74) *Attorney, Agent, or Firm* — Shapiro, Gabor and Rosenberger, PLLC

(57) ABSTRACT

An image processing apparatus includes an image processing unit that calculates two types of image data from one image data and outputs the calculated image data, a data combination unit that combines the two type of data supplied from the image processing unit and outputs the combined data to one terminal, an output buffer that adjusts an output timing of the combined data according to an instruction supplied from bus arbitration means for arbitrating a bus, and a data distribution unit that outputs the combined
(Continued)

data output from the output buffer to the bus in a form of the combined data, or distributes the combined data and outputs the distributed data to the bus according to an external combination distribution instruction.

10 Claims, 14 Drawing Sheets

Related U.S. Application Data continuation of application No. 15/290,831, filed on Oct. 11, 2016, now Pat. No. 9,986,196, which is a continuation of application No. 14/530,770, filed on Nov. 2, 2014, now Pat. No. 9,503,637, which is a continuation of application No. 13/705,019, filed on Dec. 4, 2012, now Pat. No. 8,902,332.

(51) Int. Cl.
*H04N 5/232* (2006.01)
*G06T 1/20* (2006.01)
*G06T 1/60* (2006.01)
*H04N 5/91* (2006.01)

(52) U.S. Cl.
CPC .............. *H04N 5/265* (2013.01); *H04N 5/91* (2013.01); *G06T 2200/28* (2013.01)

(56) References Cited

U.S. PATENT DOCUMENTS

| | | | |
|---|---|---|---|
| 6,762,799 | B2 | 7/2004 | Hayashi |
| 7,676,527 | B2 | 3/2010 | Kuromaru et al. |
| 7,903,887 | B2 | 3/2011 | Sasaki et al. |
| 7,961,226 | B2 | 6/2011 | Master et al. |
| 8,902,332 | B2 | 12/2014 | Hamasaki |
| 9,503,637 | B2 | 11/2016 | Hamasaki et al. |
| 9,986,196 | B2 | 5/2018 | Hamasaki et al. |
| 10,104,332 | B2 * | 10/2018 | Hamasaki .............. H04N 5/265 |
| 2002/0013867 | A1 | 1/2002 | Matsuki et al. |
| 2004/0196380 | A1 | 10/2004 | Shimazu et al. |
| 2008/0246857 | A1 | 10/2008 | Hayashi et al. |

FOREIGN PATENT DOCUMENTS

| | | |
|---|---|---|
| JP | 2002-204347 A | 7/2002 |
| JP | 2005-11520 A | 1/2005 |

OTHER PUBLICATIONS

Office Action dated Aug. 2, 2016, in Chinese Patent Application No. 201210529893X.
Office Action dated Jul. 4, 2017, in Chinese Patent Application No. 201210529893X.
Office Action dated Mar. 2, 2017, in Chinese Patent Application No. 201210529893X.

* cited by examiner

SEMICONDUCTOR DEVICE AND IMAGE PROCESSING METHOD

CROSS-REFERENCE TO RELATED APPLICATIONS

This application is based upon and claims the benefit of priority from Japanese patent application No. 2011-268705, filed on Dec. 8, 2011, the disclosure of which is incorporated herein in its entirety by reference.

BACKGROUND

The present invention relates to a semiconductor device and an image processing method suitable for, for example, an automotive navigation system and the like.

In vehicle-mounted information terminals such as automotive navigation apparatuses (hereinafter also referred to simply as "car-navigation"), it has been desired to cope with higher-quality multimedia and to exhibit higher quality graphics performance. As a result, semiconductor devices that are mounted in vehicle-mounted information terminals, such as the SoC (System on Chip), need to have higher-performance image processing functions, and therefore various researches and developments have been in progress. Japanese Unexamined Patent Application Publication No. 2002-204347, Japanese Unexamined Patent Application Publications No. 2005-11520, and Japanese Patent No. 2827258 disclose techniques relating to image processing.

SUMMARY

The inventors of the present application have found out that there are various problems to be solved in the developments of semiconductor devices having image processing functions. Each embodiment disclosed in the present application provides a semiconductor device having a high-quality image processing function and an image processing method.

More detailed features will be understood by the following descriptions of this specification and attached drawings.

A first aspect of the present invention is a semiconductor device including an output buffer.

Another aspect of the present invention is an information processing apparatus including a semiconductor device including an output buffer, and a bus that performs data exchange between this semiconductor device and an external or internal memory.

The present invention can provide a semiconductor device having a high-quality image processing function and an image processing method.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Specific embodiments to which the present invention is applied are explained hereinafter with reference to the drawings. The same symbols are assigned to the same components throughout the drawings, and their duplicated explanation is omitted as appropriate for clarifying the explanation.

<Combination Output and Distribution Output>

There are cases where it is desired that, when some processing is to be performed for an input image, a plurality of image outputs are obtained from the one image. For example, there are cases where it is desired to obtain, from one input image, an image that is obtained by differentiating the input image in a longitudinal direction and another image that is obtained by differentiating the input image in a lateral direction. As another example, in the Harris corner detection (see Masatoshi OKUTOMI, Masao SHIMIZU, et al. "Digital Image Processing" Computer Graphic Arts Society (CG-ARTS Society)) 2004), it is necessary to obtain three output values for one input image, including the square of a longitudinal differentiation, the square of a lateral differentiation, and the product of the longitudinal differentiation and the lateral differentiation as intermediate values of the calculation.

Figure 2:
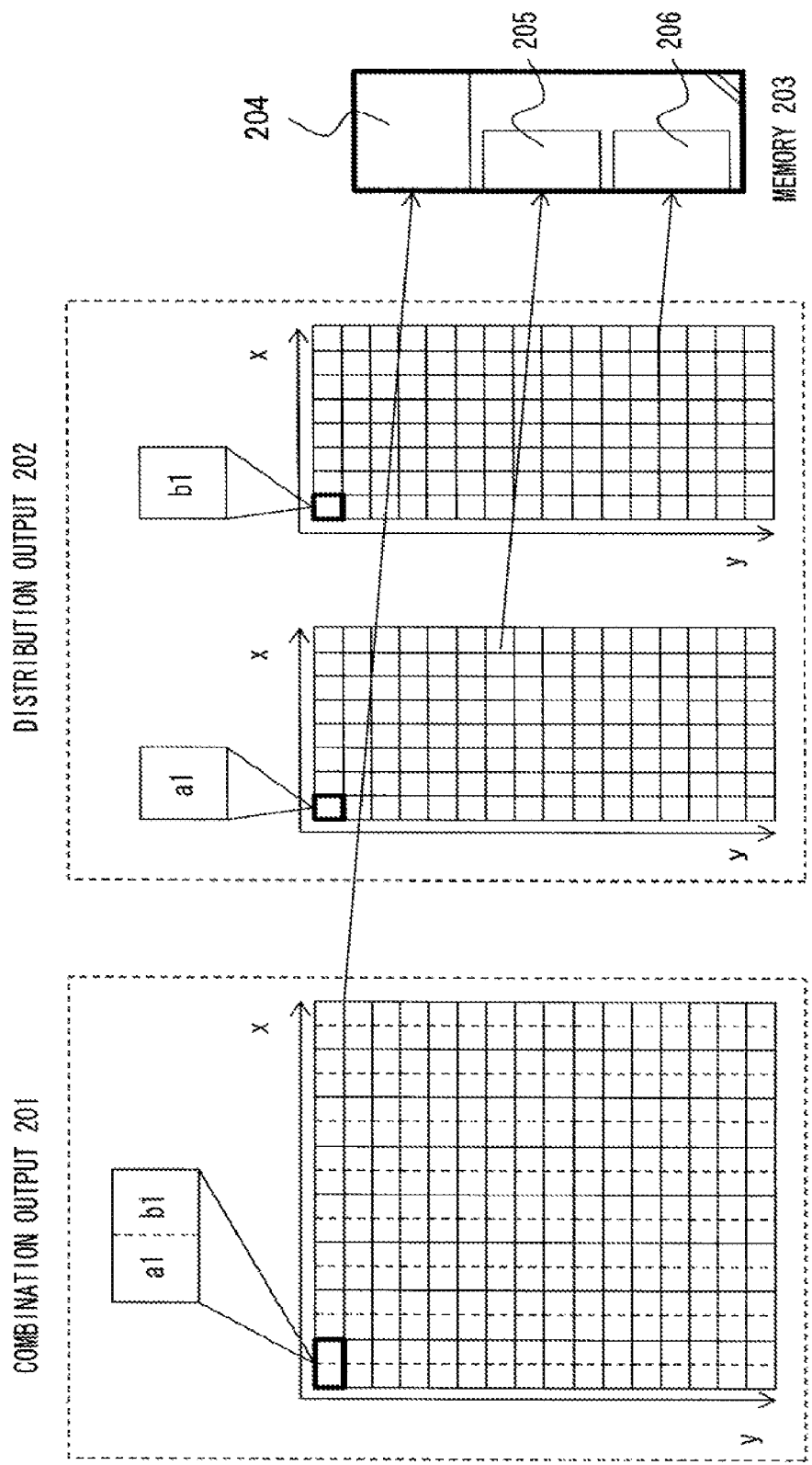
FIG. 2 is a diagram for explaining memory mapping in a case where two or more data are calculated for one pixel.

FIG. 2 is a diagram for explaining memory mapping in a case where two or more data are calculated for one pixel. In the case like this, as an output scheme as shown in FIG. 2, there are two possible schemes including a scheme in which a plurality of output values "a" and "b" are successively arranged and output as one pixel (hereinafter this output scheme is referred to as "combination output" (201 in FIG. 2)) and a scheme in which they are output as different images "a" and "b" (hereinafter this output scheme is referred to as "distribution output" (202 in FIG. 2)). Note that in the case of the combination output 201, the mapping on the memory 203 becomes the mapping 204. Further, in the case of the distribution output 202, the mapping on the memory 203 becomes the mappings 205 and 206.

As an example of an image generated in the combination output format, there is a case where the color components of a pixel value are stored in the order of B(Blue), G(Green) and R(Red) for each pixel on a memory as in the case of the bitmap image format.

Figure 3:
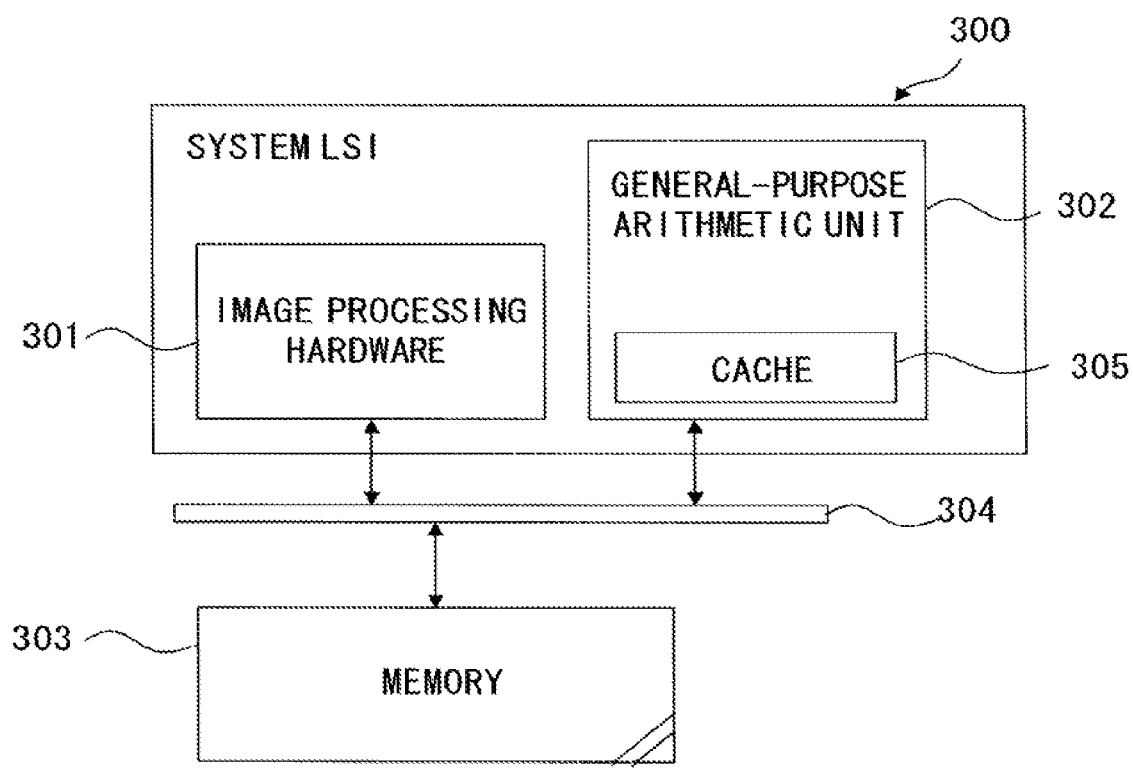
FIG. 3 shows an example of a system LSI including an image processing unit, a memory, and a general-purpose arithmetic unit.

Each of the above-described combination output 201 and distribution output 202 shown in FIG. 2 has the following advantages and disadvantages. Firstly, the combination output scheme is advantageous when a plurality of outputs (assume that the number of output data is two in this example) are collectively calculated. FIG. 3 shows an example of a system LSI including an image processing unit, a memory, and a general-purpose arithmetic unit. As shown in FIG. 3, the system LSI 300 includes image processing hardware 301, a general-purpose arithmetic unit 302 with a cache 305, and an external memory 303. Further, these blocks share a bus 304.

In the combination output, two data is successively arranged. Therefore, when they are calculated by the general-purpose arithmetic unit 302 shown in FIG. 3, the hit rate of the cache 305 is high and thus the calculation efficiency is high. Further, when they are processed by the image processing hardware 301, the mechanism for controlling the input address is simpler in comparison to that for the distribution output. This is because the two data are combined and stored in one data area. For example, in the case of the example shown in FIG. 2, in the distribution output, since the image data are stored in two different address areas, it requires two mechanisms for controlling addresses.

On the other hand, even when one of the output values is to be used in succession, both of the output values are usually read out because the two outputs are successively arranged in a memory space. Therefore, the efficiency for data transfer between the image processing hardware 301 or the general-purpose arithmetic unit 302 and the memory 303 deteriorates. The lager the number of outputs is, the worse this problem becomes. However, as described above, when it is desired that the only one of the output values is handled, or when it is desired that the output values are individually handled, the distribution output scheme is preferable. Meanwhile, when it is desired that the outputs are collectively handled, the efficiency of the distribution output schemes is poor in comparison to the combination output scheme.

Accordingly, as a result of diligent researches made by the inventors of the present application, we have found a semiconductor device having an image processing function capable of achieving both functions in such a manner that they can be selectively used, according to the user's purpose.
<Image Processing Apparatus (Comparative Example)>

Firstly, in order to make the present invention understood easily, a data output method performed by a comparative example image processing apparatus is explained hereinafter. In the following explanation, two types of data that are output from an image processing unit in synchronization with each other at a time t are represented as "at" and "bt".

Figure 13A:
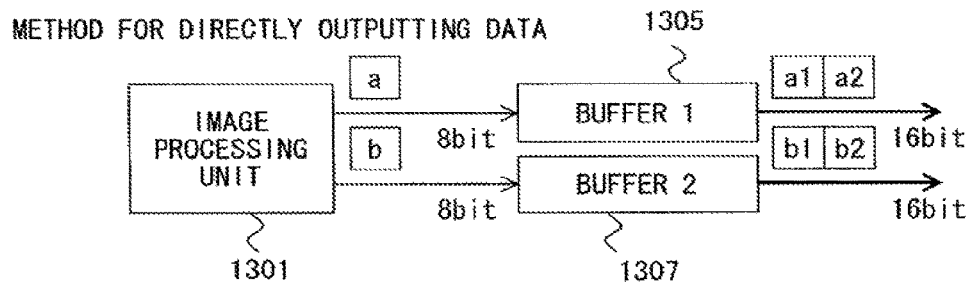
FIGS. 13A to 13C axe diagrams for explaining a data output method of an image processing unit, and show a case where a plurality of data are output (distribution output), a case where a plurality of data are collectively output (combination output), and a case where both distribution and combination outputs can be handled respectively.
Figure 13B:
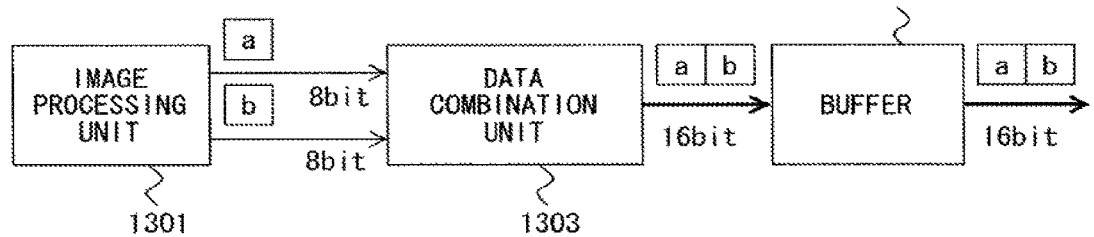
Figure 13C:
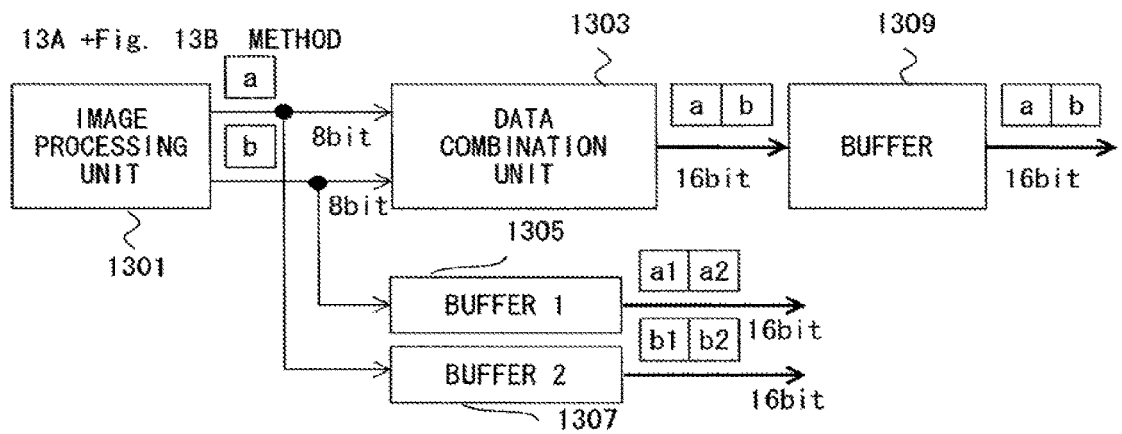

FIGS. 13A to 13C are diagrams for explaining the data output method performed by the image processing unit, and show a case where a plurality of data are output (distribution output), a case where a plurality of data are collectively output (combination output), and a case where both distribution and combination outputs can be handled respectively. The following explanation is made on the assumption that the image processing unit 1301 calculates two calculation results ("a" and "b") for one pixel.

The image processing unit 1301 shown in FIGS. 13A to 13C calculates and outputs, for example, calculation results "a" and "b", each consisting of eight bits, for one pixel. Each of the output buffers 1305, 1307 and 1303 is connected to a bus having a bus width of 16 bits, and outputs output data after arranging it into a transmission unit of 16 bits.

Firstly, as shown in FIG. 13A, when the image processing unit 1301 outputs calculation results as they are, i.e., in the case of the distribution output, it is necessary to prepare two output buffers 1305 and 1307 to output those calculation results. In contrast to this, as shown in FIG. 13B, when the image processing unit 1301 includes a data combination unit 1303, the output data are converted into combined data (16 bits consisting of "a" and "b") by the data combination unit 1303, and thus making it possible to reduce the number of the output buffers to one, i.e., one output buffer 1309. Each of the output buffers 1305, 1307 and 1309 outputs data to a bus having the same bus width of 16 bits, and thus they have the same memory capacity. That is, they are output buffers having the same size.

As described previously, depending on the image processing type, the combination output may be preferred in some cases, while the distribution output may be preferred in other cases. Therefore, ideally, the image processing apparatus should have both output functions. Therefore, as shown in FIG. 13C, the configuration is made so as to have a data combination unit 1303 and to include a data path through which two outputs of the image processing unit 1301 are output as they are to the output buffers 1305 and 1307 (Japanese Patent No. 2027258) and a data path in which the data are combined by the data combination unit 1303 and the combined data is output to the output buffer 1309.

That is, the configuration can be made in the following manner. In order to have the distribution output function, an output buffer is provided between the hardware and the memory for each output type (number). Further, in order to have the combination output function, a combination unit is provided in front of the output buffer so that data are combined and then the combined data is output to the output buffer.

With this configuration, the image processing apparatus can perform both the distribution output and the combination output. However, this configuration requires three output buffers having the same bus width of 16 bits, and thus causing a problem that the memory capacity, the circuit size and the cost increase.

First Embodiment of the Invention

Figure 1A:
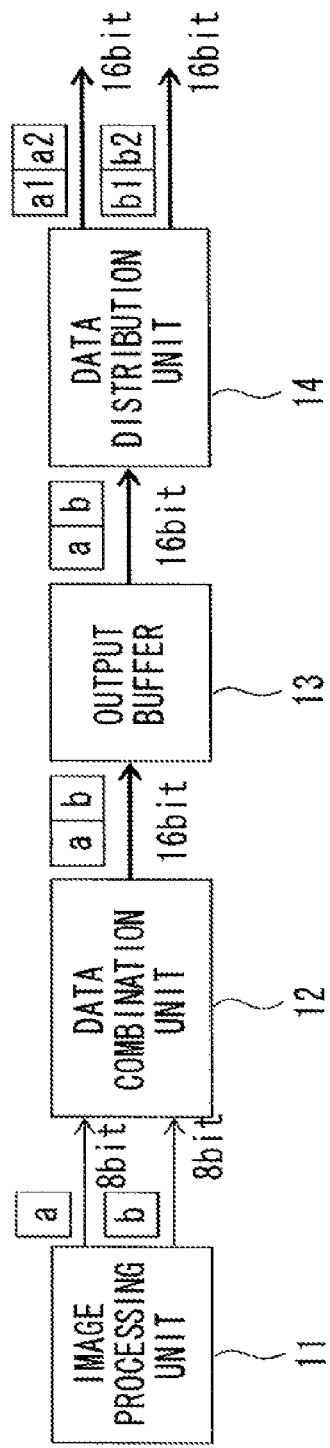
FIG. 1A is a conceptual diagram shewing a semiconductor device according to a first embodiment of the present invention.

Accordingly, the inventors of the present application have found a semiconductor device having an image processing function capable of outputting a processing result either for the combination output scheme or the distribution output scheme without increasing the number of output buffer(s). FIG. 1A is a conceptual diagram snowing a semiconductor device according to a first embodiment of the present invention.

As shown in FIG. 1A, the semiconductor device includes an image processing unit 11, a data combination unit 12, an output buffer 13, and a data distribution unit 14. Similarly to the image processing unit 1301 explained above with reference to FIGS. 13A to 13C, the image processing unit 11 outputs two 8-bit calculation results "a" and "b" for one pixel. The data combination unit 12 combines the data "a" and "b" output from the two output terminals of the image processing unit, and outputs the combined data consisting of 16 bits in total to the output buffer 13. The output buffer 13 adjusts the output timing of the combined data according to an instruction from bus arbitration means (not shown) for arbitrating a bus, and thereby outputs the combined data to the data distribution unit 14 at the timing according to the instruction from the bus arbitration means. The data distribution unit 14 outputs the combined data supplied from the output buffer 13 as it is as 16-bit data to a bus (not shown), or distributes (or rearranges) the combined data into 16-bit data and outputs the distributed data to the bus according to an external combination distribution instruction.

In this way, a plurality of output results output from the image processing unit (image processing hardware) 11 are temporarily combined (arranged) and transferred to the subsequent output buffer 13, and the combined data is further transferred from the output buffer 13 to the subsequent data distribution unit 14. Then, the combined data is sent out to the bus in the form of the combined data, or is divided again and sent out as distributed data according to the purpose. Thus, it is possible to adjust data info an efficient data length. Further, this series of processes including the combination, the buffering and the division is performed without using the external memory, and thus does not use the bus bandwidth.

That is, in this embodiment, a plurality of data are temporarily combined to be sent out to the output buffer 13 regardless of whether the output format is the distribution output format or the combination output format. Further, a mean for re-distributing (or rearranging) data according to the output format is provided behind the output buffer 13. As a result, it is possible to implement the mechanism of the output buffer 13 in a small area. Further, by providing the data distribution unit 14, it is possible to output processing results in both output formats. Furthermore, since the process is performed without using the external memory, the output process can be performed in either the combination output format or the distribution output format without increasing the data transfer amount/processing time between the memory and the image processing hardware.

Second Embodiment of the Invention

Figure 1B:
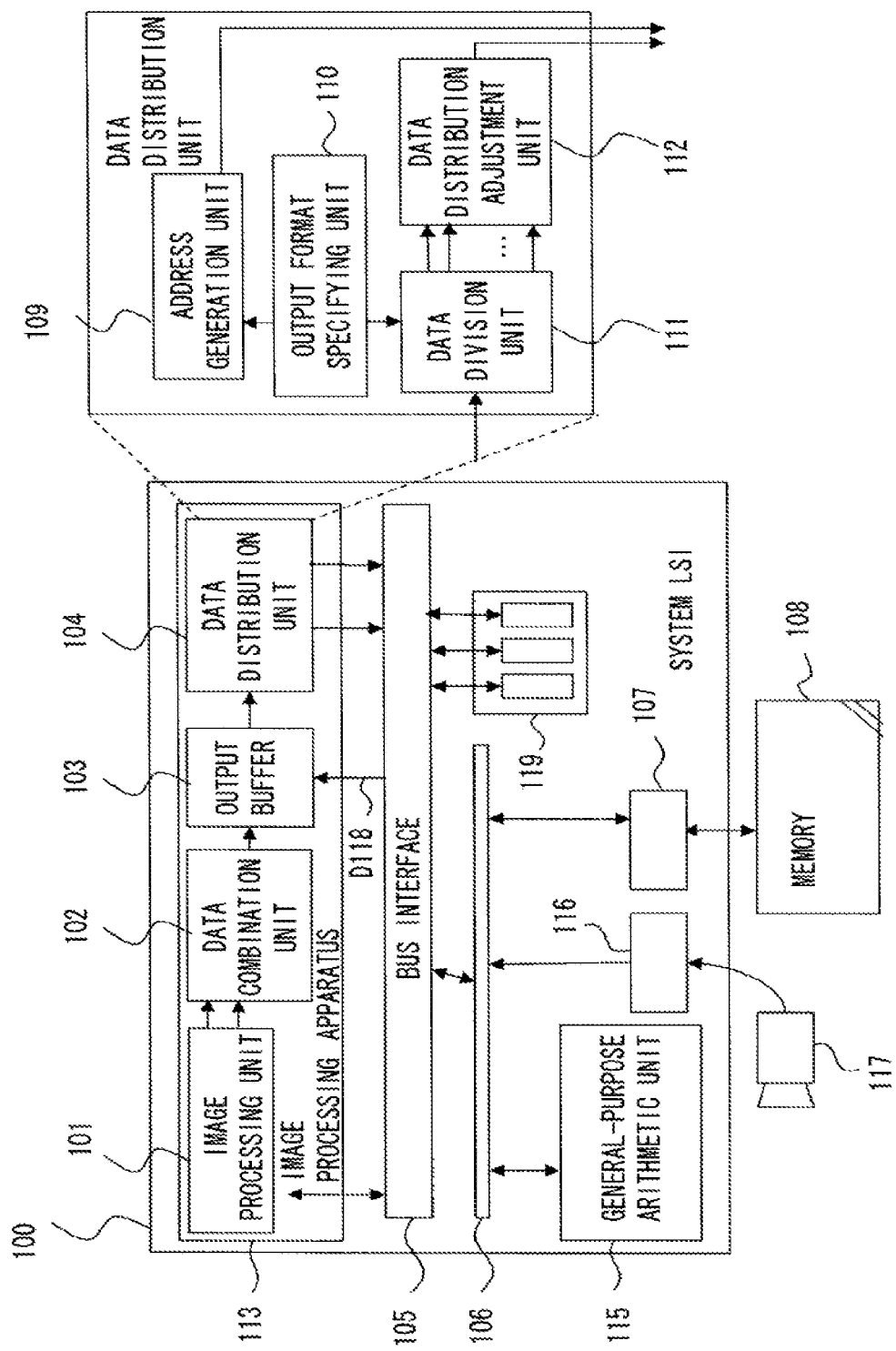
FIG. 1B is a block diagram showing a system LSI on which a semiconductor device according to a second embodiment of the present invention is mounted.

Next, a semiconductor device according to a second embodiment of the present invention is explained. FIG. 1B is a block diagram showing a system LSI on which a semiconductor device according to the second embodiment of the present invention is mounted. This system LSI 100 can be applied to, for example, an image processing apparatus such as an automotive navigation system.

As shown in FIG. 1B, in the system LSI 100, an image processing apparatus 113, a general-purpose arithmetic unit 115, a camera interface unit 116 connected to a camera 117, an external memory interface unit 107 connected to a memory 108, and a group of other modules 119 are connected to a bus 106, so that they are connected to each other. In FIG. 1B, the image processing apparatus 113 and the group of other modules 119 are connected to the bus 106 through a bus interface unit 105, and the timing of their data transfer is thereby adjusted. That is, the bus interface unit 105 functions as bus arbitration means.

Note that each of the general-purpose arithmetic unit 115, the camera interface unit 116, and the external memory interface unit 107 may include bus arbitration means between that unit and the bus 106, so that their access timing to the memory 108 may be also arbitrated.

The image processing apparatus 113 according to this embodiment includes an image processing unit 101 including two output terminal, a data combination unit 102 that combines data from the two output terminals of the image processing unit 101 and outputs the combined data to one terminal, an output buffer 103 that adjusts the output timing of the combined data according to a transmission permission signal D118 supplied from bus arbitration means for arbitrating the bus (bus interface unit 105 in this example), and a data distribution unit 104 that outputs the combined data supplied from the output buffer 103 to the bus 106 (bus interface unit 105) in the form of the combined data, or distributes (or rearranges) the combined data and outputs the distributed data to the bus 106 (bus interface unit 105) according to an external combination distribution instruction.

Note that the number of the output terminals of the image processing unit 101, i.e., the number of data output as calculation results is not limited to two and may be three or more. The data combination unit 102 combines output data output from the image processing unit 101 and thereby generates combined data, whose number is smaller than the number of the output terminals of the image processing unit 101. Further, the data combination unit 102 outputs the combined data to the output buffer 103. The output buffer 103 is individually provided for each output terminal of the data combination unit 102. Since the data combination unit 102 generates combined data, the number of the output buffer(s) 103 can be reduced. For example, when the image processing unit 101 performs a complex operation and thereby produces four processing results for one pixel, four data are input to the data combination unit 102. However, when these data are combined into one combined data, the number of necessary output buffer 103 is one. When these data are combined into two combined data, the number of necessary output buffers 103 is two. Further, when these data are combined into three combined data, the number of necessary output buffers 103 is three. In any of these cases, by generating combined data at the data combination unit 102, it is possible to reduce the number of the output buffer(s) 103 to a number smaller than the number of the outputs of the image processing unit 101, i.e., a number smaller than four.

The bus interface unit 105 is also connected to the group of other modules 119 in addition to the image processing apparatus 113, and performs the arbitration of data transfers to the bus by referring to the priority order or the like of each module. In recent years, the number of modules that connect to the memory 108 through the bus 106 is increasing. Therefore, the bus interface unit 105 performs, for example, a process for raising the priority of a module that performs processing that needs to be performed on a real time basis.

As the number of modules increases in recent years, the wait time for which each module is kept waiting before performing a data transfer to the memory 108 also becomes longer. Therefore, each of the image processing apparatus 113 and the group of other modules 119 requires an output buffer capacity sufficient for the waiting time like this, and thus causing a problem that the circuit size is becoming larger. However, as described above, in this embodiment, since the data combination unit 102 combines output data of the image processing unit 101 and outputs the combined data to one output terminal, the number of necessary output buffer 103 is only one. Further, this combined data is output as it is or output as distributed data by the subsequent data distribution unit 104. Therefore, the output process can be performed by providing only one output buffer 103 regardless of whether the output format is the combination output format or the distribution output format.

Further, this embodiment is not limited to the configuration shown in FIG. 1B. For example, the camera 117 may be directly connected to the image processing apparatus 113, or the image processing apparatus 113 may foe equipped with the camera 117. Further, the image processing apparatus 113 may be connected to the bus without interposing the bus interface unit 105 therebetween. In such cases, arbitration means for arbitrating data output timing from each module to the bus may be provided.

<Configuration of Image Processing Apparatus 113>

Next, the internal configuration of the image processing apparatus 113 is explained. The image processing apparatus 113 reads image data stored in the memory 108 and performs some calculation in the image processing unit 101. Assume that in this calculation, the image processing unit 101 outputs a plurality of calculation results (e.g., "a1" and "b1" in FIG. 2) at each time unit. This time unit is determined, for example, based on the operating frequency of the image processing unit 101. Assuming that the operating frequency is 100 MHz and the image processing unit 101 can output calculation results at each cycle, the time unit is 10 ns. However, according to the configuration of this embodiment, the image processing unit 101 does not necessarily have to output calculation results at each cycle.

Through the subsequent data combination unit 102, the output buffer 103 and the data distribution unit 104, the image processing apparatus 113 selectively outputs processing results to the memory 108 in either the combination output format or the distribution output format.

<Configuration of Data Combination Unit 102>

The subsequent data combination unit 102 receives the above-described plurality of calculation results and outputs the group of these plurality of calculation results as one transmission unit to the subsequent output buffer 103. For example, assuming that each output consists of eight bits, data "a1" and "b1" are output from the image processing unit 101 at a time t=2. Then, the data combination unit 102 puts together these data "a1" and "b1" into a 16-bit data and transmits the 16-bit data to the output buffer 103.

Figure 10:
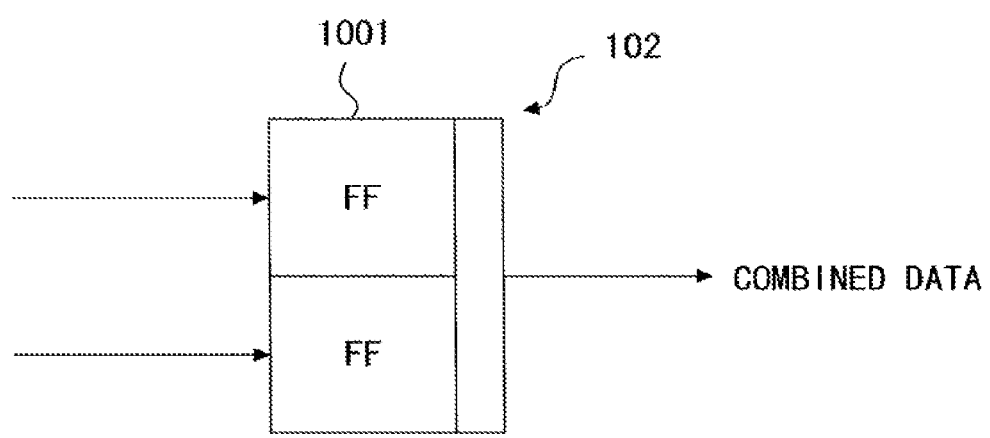
FIG. 10 shows an example of a configuration of a data combination unit 102.

FIG. 10 shows an example of a configuration of the data combination unit 102. As shown in FIG. 10 and as described above, in a case where 8-bit data are put together into and output as a 16-bit data, the data combination unit 102 can be formed from two flip-flops 1001. That is, a plurality of data are received by the plurality of flip-flops 1001. Then, they are put together into combined data and the combined data is output to the subsequent output buffer 103.

<Configuration of Output Buffer 103>

Next, the output buffer 103 is explained. The output buffer 103 according to this embodiment plays the following two roles. The first role is to take on a FIFO-like configuration when the bus 106 is congested, and thereby to make data waited for distributions. In this case, the output buffer 103 receives the transmission permission signal D118 from the bus interface unit 105, for example, and thereby outputs the data to the subsequent data distribution unit 104. The second role is to rearrange the data received from the data combination unit 102 (hereinafter, also referred to as "combined data") into the data transmission unit for the bus 106. Assuming that the data transmission unit to the bus 106 is 32 bits, the output buffer 103 puts together two combined data received from the data combination unit 102 and sends out the combined data to the subsequent data distribution unit 104. For example, the output buffer 103 puts together received data {a1, b1} and {a2, b2} into a 32-bit data {a1, b1, a2, b2} and sends out the 32-bit combined data to the subsequent data distribution unit 104.

Figure 11:
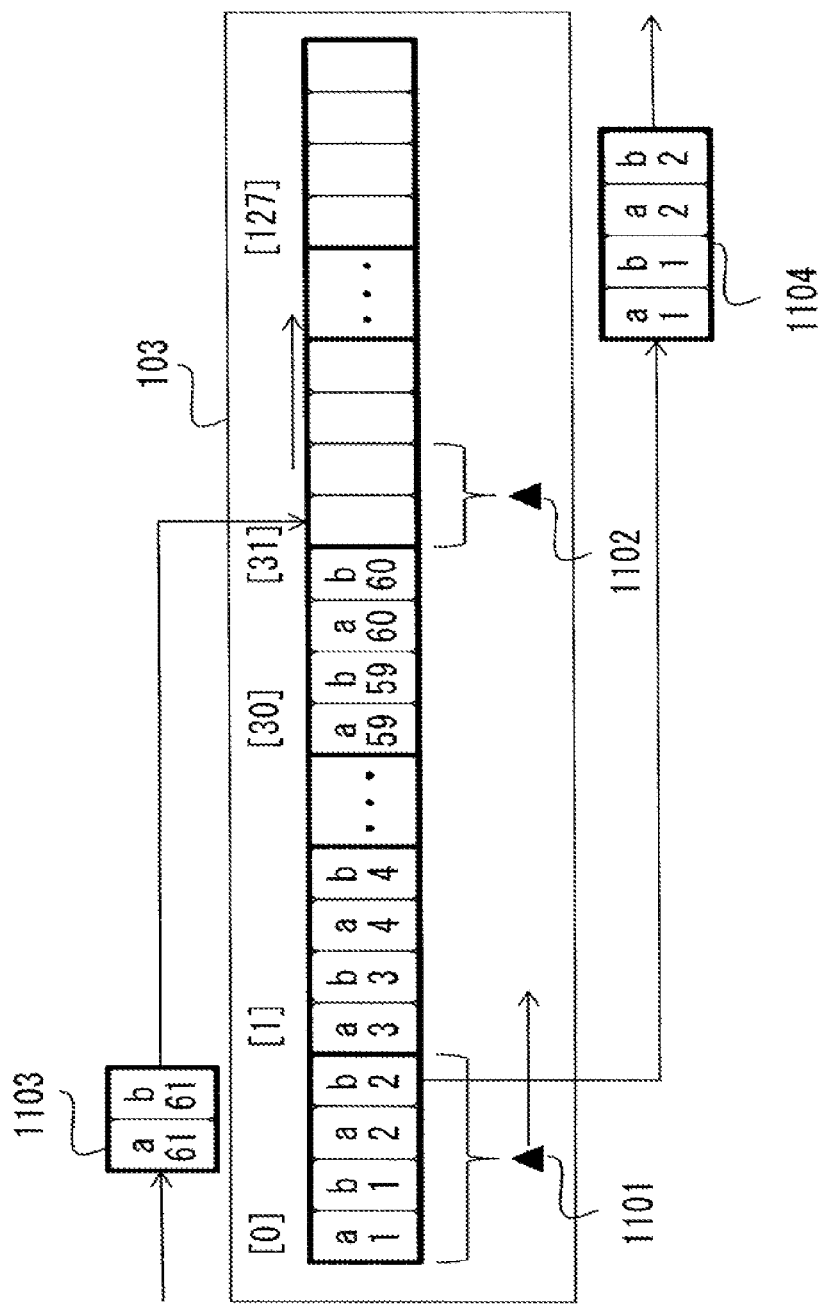
FIG. 11 shows an example of a configuration of an output buffer.

Next, the output buffer 103 is explained in a more detailed manner. FIG. 11 shows an example of a configuration of the output buffer that transmits/receives data in 32-bit data transfer units. This output buffer 103 can be formed, for example, from a plurality of FIFOs. Further, the output buffer 103 temporarily stores combined data 1103 delivered from the data combination unit 102. Then, when the data length becomes equal to the unit for transmission to the bus 106 and a transmission permission signal D118, which indicates that the transmission is permitted, is received from the bus interface unit 105, the output buffer 103 sends out data 1104 having the data length equal to the unit for transmission to the subsequent data distribution unit 104.

This output buffer 103 is connected to the bus interface unit 105 through the connection line through which the transmission permission signal D118 is received. Further, upon receiving the transmission permission signal D118 as described above, the output buffer 103 reads out a 32-bit signal from a point indicated by a read pointer 1101, and sends out this read data 1104 to the subsequent data distribution unit 104. In this way, the output buffer 103 needs to store 16-bit combined data 1103 sent from the data combination unit 102 until the output buffer 103 receives the transmission permission signal D118.

Therefore, the capacity of the output buffer 103 is determined based on the data transfer capability of the bus itself, the data transfer priority of the image processing apparatus 113 relative to other modules, the data transfer amount necessary for the group of other modules 119 that share the bus interface unit 105, the data transfer amount necessary for other modules that share the bus 106 (which is located on the other side of the bus interface unit 105) including the general-purpose arithmetic unit 115, the camera interface unit 116 and the external memory interface unit 107, and so on. For example, when it is necessary to store 32 bits×128 data, the capacity of the output buffer 103 is 512 bytes.

In general, when one of the other modules 119 is transmitting or receiving data to or from the memory 108, the output buffer 103 cannot access the memory 108. In general, the access permission is given to one of the modules that share the memory 108 in a rotation basis. Therefore, the lager the number of the group of other modules 119 that share the bus interface unit 105 is, the larger the required capacity of the output buffer 103 becomes. Further, the number of the other modules that share the bus 106 is, the larger the required capacity of the output buffer 103 becomes. Note that, for example, when a certain module needs to process data on a real time basis, the priority of that module for the use of the bus 106 becomes high.

Thus, the output buffer 103 shown in FIG. 11 serves as FIFOs by having the read pointer 1101 and the write pointer 1102. When the data 1104 is sent out to the subsequent data distribution unit 104, the point indicated by the read pointer 1101 shifts by 32 bits. When the combined data 1103 is received from the data combination unit 102, the point indicated by the write pointer 1102 shifts by 16 bits. Both of the pointers 1101 and 1102 return to the start point when reading or writing is performed to the end point of the buffer, and therefore output buffer 103 functions as a ring buffer.

Figure 12:
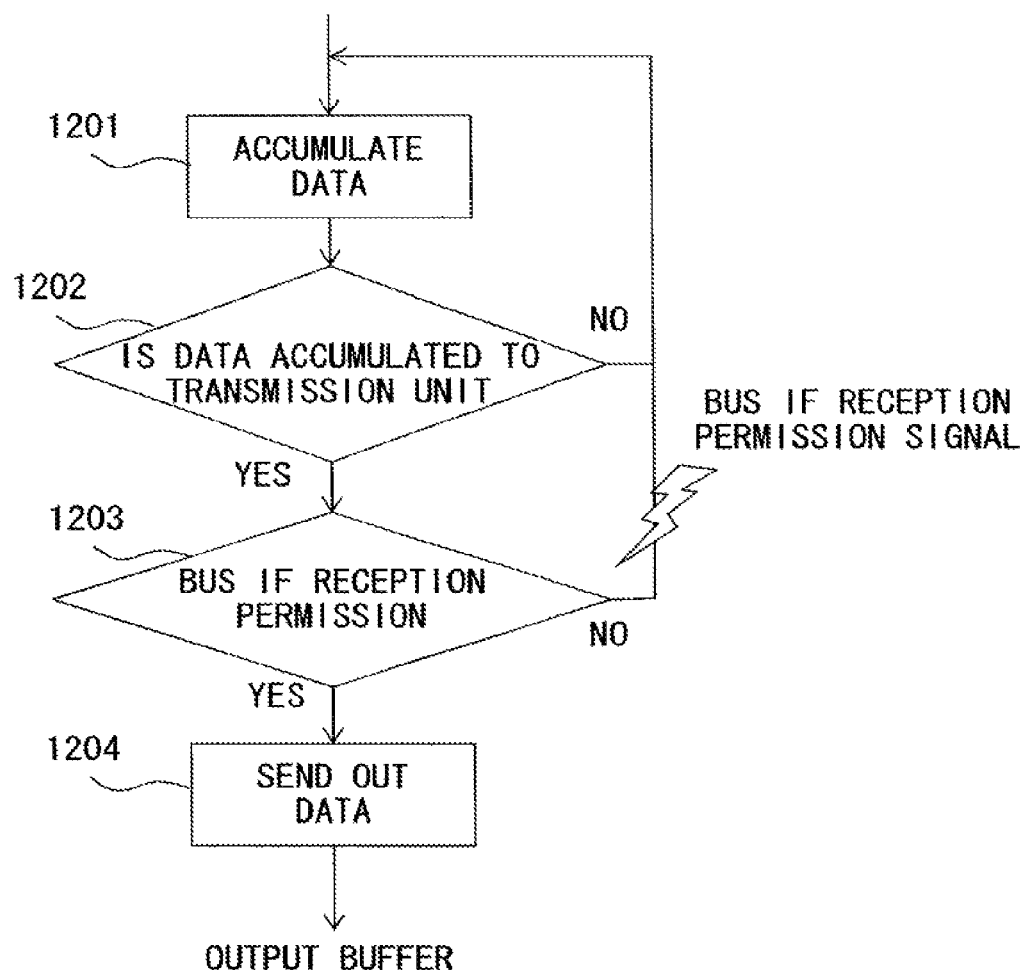
FIG. 12 is a flowchart showing an operation of an output buffer.

FIG. 12 is a flowchart showing an operation of the output buffer. As shown in FIG. 12, firstly, combined data 1103 received from the data combination unit 102 are accumulated (step S1201). Then, when they are accumulated to the transmission unit for the output buffer 103 (step S1202: Yes), the output buffer 103 waits until the transmission permission signal D118 is received. During that period, combined data 1103 from the data combination unit 102 are successively accumulated. Then, when the transmission permission signal D118 is received (step S1203: Yes), the output buffer 103 sends out the data 1104 (step S1204).

<Configuration of Data Distribution Unit 104>

Next, the configuration of the data distribution unit 104 is explained in a more detailed manner. Referring to FIG. 1B again, the data distribution unit 104 includes an address generation unit 109, an output format specifying unit 110, a data division unit 111, and a data distribution adjustment unit 112. This data distribution unit 104 has a mechanism for arranging the combined data supplied from the output buffer 103 according to the output format specified by the output format specifying unit 110, e.g., according to the distribution output format or the combination output format in this embodiment, and outputting the arranged data to the bus interface unit 105.

In particular, the data division unit 111 in the data distribution unit 104 re-divides the combined data combined by the data combination unit 102, and the data distribution adjustment unit 112 readjusts the data into the data length suitable for outputting the data to the bus 106 and outputs the readjusted data to the bus interface unit 105.

When the processed image data is output from the image processing apparatus 113 to the memory 108, it is necessary to specify the memory address of the output destination. It is necessary to output one type of an address to the bus interface unit 105 in the case of the combination output format. Further, it is necessary to output two types of addresses to the bus interface unit 105 in the case of the distribution output format. The bus interface unit 105 transfers the data to the memory 108 through the bus 106 and the external memory interface unit 107 according to this address (or these addresses).

The memory address(es) is generated by the address generation unit 109. In the case of the combination output format, the address generation unit 109 generates one set of exclusively-successive address for the successively-delivered output data. For the distribution output scheme in which the output is distributed (or rearranged) into two or more outputs, the address generation unit 109 generates two or more sets of exclusively-successive addresses. Examples of a method for generating two or more sets of addresses includes a method in which two or more sets of addresses are individually generated by two or more address generation units, and a method in which one set of addresses is first generated and another set of addresses is generated by adding an offset value(s) to the one set of addresses. This embodiment adopts the latter method in which another set of addresses is generated by using the offset value(s).

<Specific Example of Data Distribution Unit 104>

Figure 4:
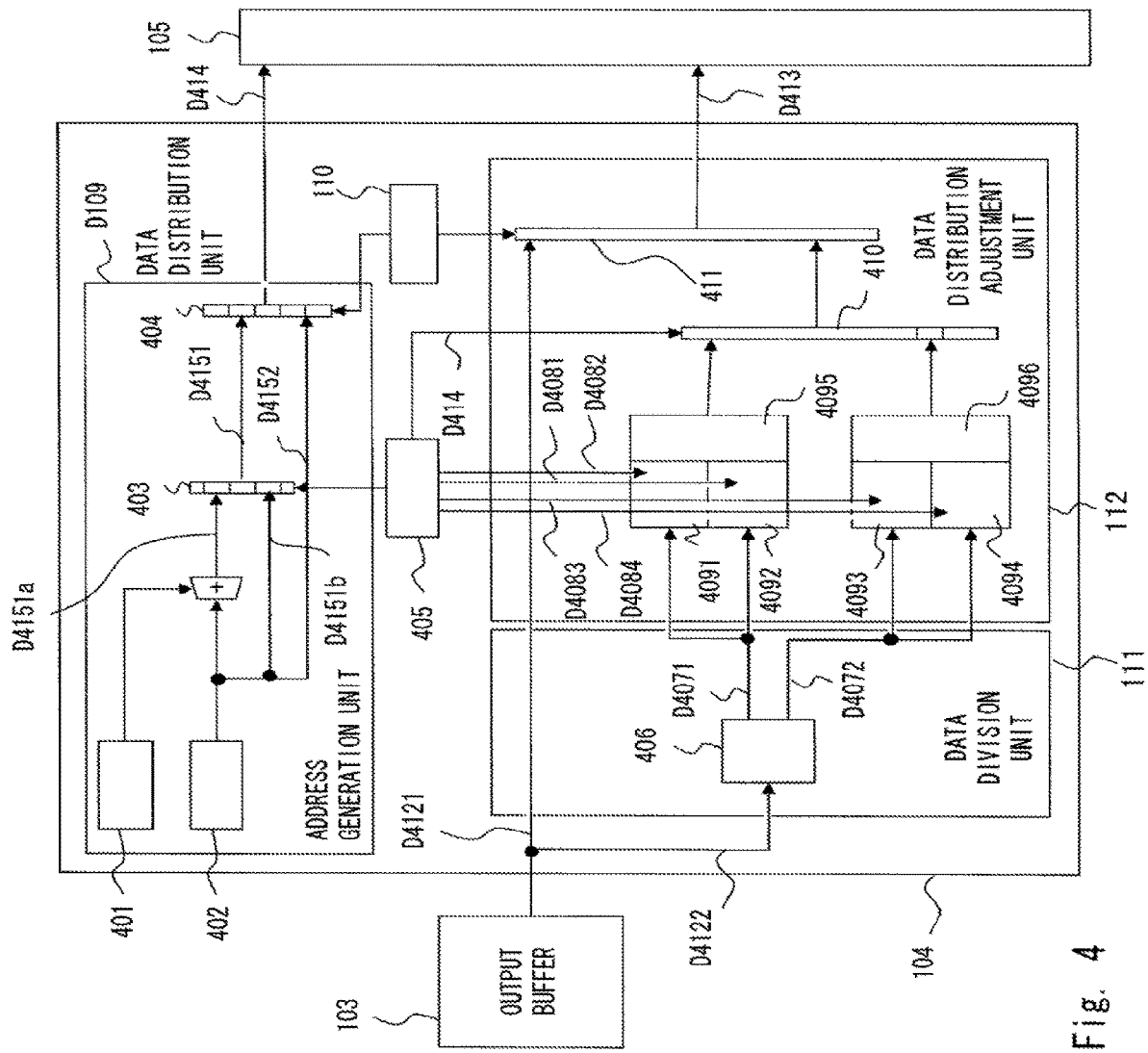
FIG. 4 shows a specific example of a data distribution unit 104.

Next, an example of the data distribution unit 104 is explained in detail. FIG. 4 shows an example of the data distribution unit 104. Note that in the explanation of FIG. 4, connection lines between blocks or circuits are represented by numerals having a prefix "D". For example, a connection line between the output buffer 103 and a selector 411 is represented as "D4121". Further, the following explanation is made on the assumption that, taking the symbol D4121 as an example, the symbol D4121 may mean any of "connection line" between the output buffer 103 and the selector 411, "signal" flowing through this connection line, and "data" delivered through this connection line.

Firstly, assuming that the output format specifying unit 110 specifies the combination output format, data output from the output buffer 103 is directly transmitted to the subsequent selector 411 through the connection line D4121.

<Specific Example of Data Division Unit 111>

The data division unit 111 includes a data step division unit 406 within it. This data division unit 111 is a mechanism for the distribution output format. Typically, data of the data combination unit 102 and data arranged by the output buffer 103 is in a stepping-stone sate (stepped state) in terms of the data type. When this data is to be divided into two outputs, if is equivalent to dividing an input data string into odd-numbered data and even-numbered data. Based on this, in this specification, the term "step division" means collecting data from the output buffer 103 and dividing the collected data according to the output type.

Figure 5:
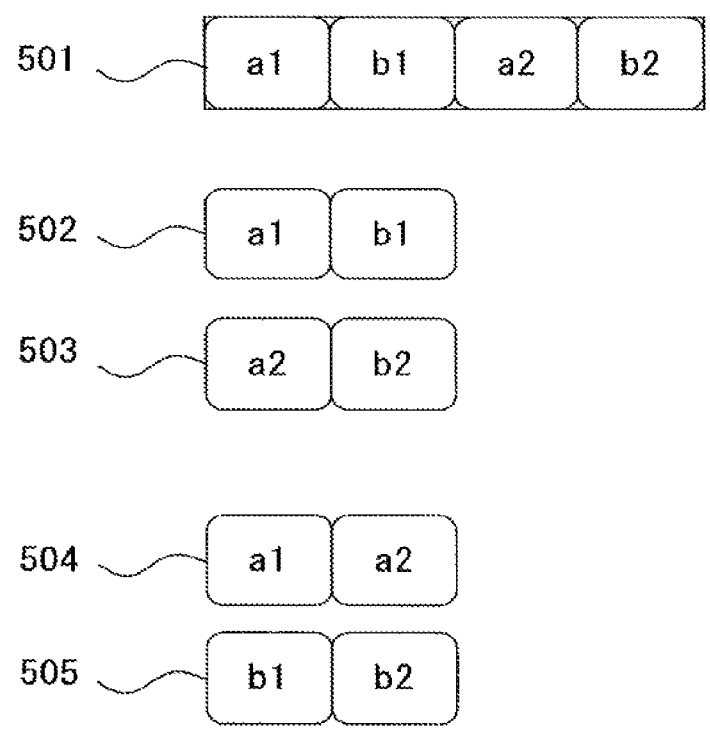
FIG. 5 is a diagram for explaining an operation of a data division unit 111.

Next, an operation of the data division unit 111 is explained. There is explained a case where, as indicated toy the numeral 501 in FIG. 5, a data string {a1, b1, a2, b2} is input from the output buffer 103 to the data step division unit 406 as one combined unit. The data indicated the numeral 501 is data that flows through the connection lines D4121 and D4122. For the sake of compatibility with the data distribution adjustment unit 112 (which is described later), each of the data a1, b1, a2 and b2 is 8-bit data and thus they are 32-bit data in total. The data step division unit 406 receives this data string, divides the input data string into odd-numbered data and even-numbered data, and outputs a data string {a1, a2} 504 and a data string {b1, b2} 505. These outputs flow through the connection lines D4121 and D4122 respectively and are input to buffers 4091 and 4092 and buffers 4093 and 4094 respectively.

<Specific Example of Data Distribution Adjustment Unit 112>

Next, the data distribution adjustment unit 112 is explained. The data distribution adjustment unit 112 functions as means for rearranging data into the bit length predefined for the bus 106 and outputting the rearranged data to the bus interface unit 105. It is assumed that the bit length predefined for the bus 106 is 32 bits as in the case of the above-described example. Each of the buffers 4091 to 4094 stores 16-bit data. An input output switch control unit 405 outputs switch control signals D4081 to D4084 to the buffers 4091 to 4094.

In this case, a pair of switch control signals D4081 and D4083 or a pair of switch control signals D4082 and D4084 alternately permits an input to either the buffers 4091 and 4092 or the buffers 4093 and 4094. Each of buffers 4095 and 4096 can store 32-bit data. Further, the buffers 4095 and 4096 temporarily store the data of the pair of buffers 4091 and 4092 and the data of the pair of buffer's 4093 and 4094 respectively. A selector 410 selects one of the values held by the buffers 4095 and 4096 as the value to be output. This selection is made according to an input switch signal D414. As a result, one of the values held by the buffers 4095 and 4096 is selected and output by the selector 410.

In comparison to the above-described configuration in which an output buffer is provided for each output data type, this embodiment requires only these additional buffers 4091 to 4094 for the one output buffer 103. Therefore, the capacity of storage devices that need to foe mounted is small. Specifically, assuming that, for example, the capacity of the output buffer 103 is 512 bytes as in the case of the above-described example, the related art requires an output buffer for each of the combination output format and the distribution output format. As a result, the related art requires 1024-bytes as the capacity of the output buffers.

In contrast to this, this embodiment requires one output buffer 103 having a capacity of 512 bytes and additional four buffers each of which consist of 16 bits (8 bytes in total). That is, this embodiment requires 520 bytes in total. In other words, this embodiment makes it possible to output data both in the combination scheme and the distribution scheme without increasing the capacity of the storage device required as the output buffer 103.

The selector 411 controls which of the combination output 201 and the distribution output 202 is to be delivered to the bus interface unit 105. This control is performed according to the setting of the output format specifying unit 110. That is, when the combination output format is specified by the output format specifying unit 110, the data D4121 is output to the connection line D413. Further, when the distribution output format is specified, the data sent out from the selector 410 is output to the connection line D413.

Figure 6:
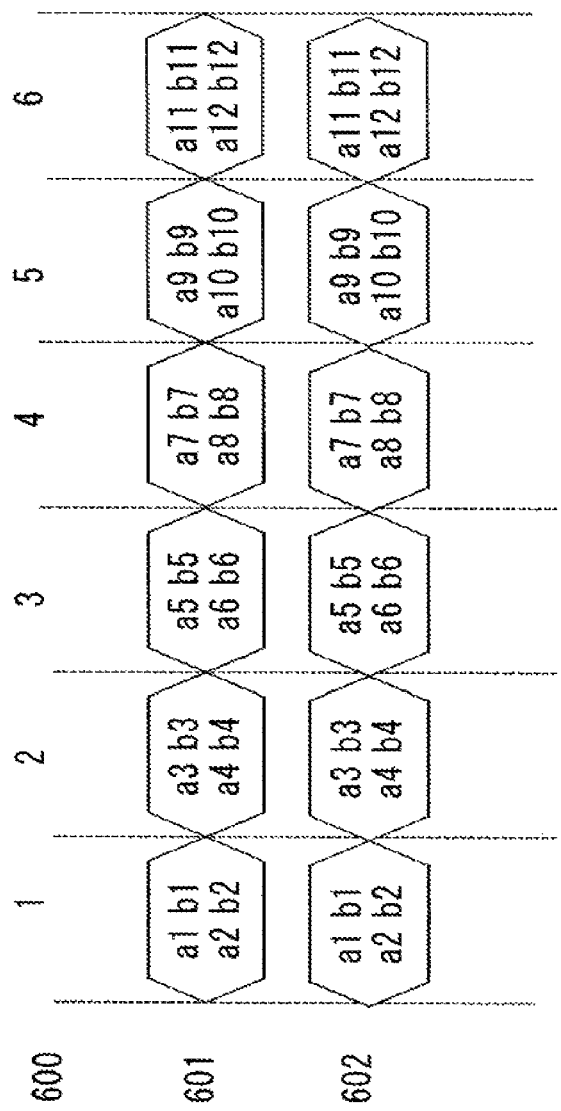
FIG. 6 is a timing chart showing a case where an output format is a combination output 201 format.

FIG. 6 is a timing chart for a case where the output format is the combination output 201 format. A row number 600 represents time τ. At a given time τ, signals delivered front the output buffer 103 are expressed by using subscripts i and j, i.e., as {ai, bi, aj, bj} (where i=2 τ−1, j−2 τ). In the case of the combination output 201, a data string output, from the output buffer 103 is output as it is. A signal 601 represents data flowing through the connection line D4121 and a signal 602 represents data flowing through the connection line D413.

Figure 7:
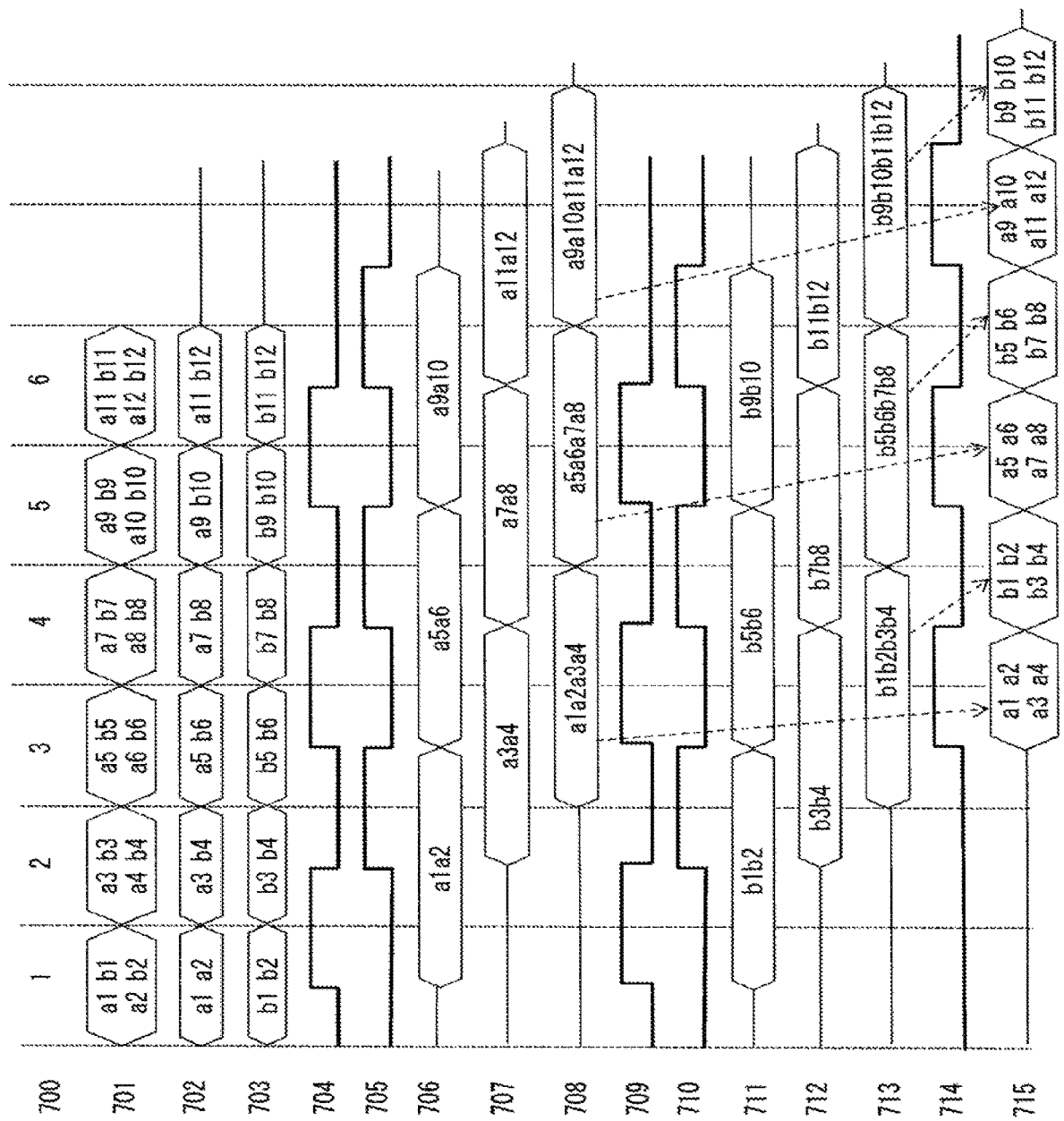
FIG. 7 is a timing chart showing timings from a data division unit 111 to a data division adjustment unit 112.

FIG. 7 is a timing chart for a case where the output format is the distribution output 202 format. A numeral 700 represents time τ. Further, the numeral 701 represents a signal flowing through the connection line D4122 (output of the output buffer 103). Numerals 702 and 703 represent the outputs D4071 and D4072 respectively from the data step division unit 406. A numeral 704 represents a signal propagating from the input output switch control unit 405 to the buffer 4091 (signal flowing through the connection line D4081); a numeral 705 represents a signal propagating from the input output switch control unit 405 to the buffer 4092 (signal flowing through the connection line D4082); a numeral 709 represents a signal propagating from the input output switch control unit 405 to the buffer 4093 (signal flowing through the connection line D4083); and a numeral 710 represents a signal propagating from the input output switch control unit 405 to the buffer 4094 (signal flowing through the connection line D4084).

When the signal is at a High level, the writing is permitted, whereas when the signal is at a Low level, the writing is not permitted. Numerals 706, 707, 711 and 712 correspond to values held by the buffers 4091 to 4094 respectively. Further, numeral 708 and 713 correspond to values held by the buffers 4095 and 4096 respectively. A numeral 714 represents a signal flowing from the input output switch control unit 405 to the selector 410, and corresponds to the connection line D414. When the signal is at a High level, the data of the buffer 4095 is output to the selector 410, whereas when the signal is at a Low level, the data of the buffer 4096 is output to the selector 410.

At a time τ=1, a 32-bit signal string {a1, b1, a2, b2} output from the output buffer 103 is divided into two 16-bit signal strings {a1, a2} and {b1, b2} by the data step division unit 406, and they are output to the connection lines D4071 (see 702) and D4072 (see 703) respectively. The data {a1, a2} is sent to the buffers 4091 and 4092. However, at this point, since the input permission signal is output only to the buffer 4091 from the input output switch control unit 405 through the connection line D4081 (signal 704 is High), the data {a1, a2} is stored only in the buffer 4091.

In FIG. 7, at the time τ=1, the data {a1, a2} is stored in the numeral 706 {buffer 4091} and is not reflected in the numeral 707. Similarly, the data {b1, b2} is sent to the buffers 4093 and 4094. However, since the input is permitted {high} only for the numeral 709 (connection line D4083) and is not permitted for the numeral 710 (connection line D4084), the data is stored only in the buffer 4093 (corresponding to numeral 711).

At a time τ=2, the data step division unit 406 receives a data string {a3, b3, a4, b4} from the output buffer 103. Similarly to the above-described data string, this data string is divided into data {a3, a4} and {b3, b4} by the data step division unit 406 and they are output to the connection lines D4071 and D4072 respectively. As for the output to the buffers 4091 to 4094, the signals from the input output switch control unit 405 are inverted from those of the above explanation. Therefore, since the signals flowing through the connection lines D4082 and D4084 become a High level, the data {a3, a4} and {b3, b4} are stored in the buffers 4092 and 4094 respectively.

When both the pair of buffers 4091 and 4092 and the pair of buffers 4093 and 4094 are updated, the buffers 4095 and 4096 are updated. The values of the buffers 4095 and 4096 are represented by numerals 708 and 713 respectively. The data {a1, a2, a3, a4} and {b1, b2, b3, b4} are stored in the buffers 4095 and 4096 respectively.

Next, these pairs are successively output to the bus interface unit 105. The numeral 714 represents the signal input from the input output switch control unit 405 to the selector 410 (signal flowing through connection line D414), and the numeral 715 represents the signal input from the selector 411 to the bus interface unit 105 (signal flowing through connection line D413).

In the case of the distribution output 202, by the switching of the signal D414 (see 714) supplied from the input output switch control unit 405, the 32-bit data {a1, a2, a3, a4} and {b1, b2, b3, b4} are successively output to the bus interface unit through the connection line D413 (see 715). Specifically, when the signal D414 is at a High level, the data of the buffer 4095 is output from the selector 410 to the subsequent selector 411, whereas when the signal D414 is at a Low level, the data of the buffer 4096 is output from the selector 410 to the subsequent selector 411.

<Specific Example of Address Generation Unit 109>

Next, the address generation unit 109 is explained. The address generation unit 109 changes the address output according to the setting of the output format specifying unit 110. Specifically, based on the selection of the selector 404, when the combination output 201 format is selected, the signal (connection line) D4152 is selected and output. Further, when the distribution output 202 format is selected, the signal D4151 is selected and output by the output format specifying unit 110. By alternately selecting and outputting the signals D4151a and D4151b by the input output switch control unit 405, addresses for both formats are generated.

As described above, in this example, a plurality of address outputs are implemented by using a certain base address (hereinafter called "base address") and an address(es) obtained by giving an offset(s) to that base address. For example, assume that the base address is the memory address of the first output image data. A numeral 402 represents a base address generation unit, and an offset specifying unit 401 outputs an offset value to be added to the base address generated by the base address generation unit 402. This offset value is added to the base address by an adder 411 to generate an address of the second output image data (hereinafter called "offset address"). Note that the offset specifying unit 401 and the adder 411 form an offset giving unit.

On the other hand, when the setting of the output format specifying unit 110 is the combination output 201 format, the address output from the base address generation unit 402 is output as it is to the bus interface unit 105 through a selector 404 which serves as the second selector (connection line D4152). This address output is performed in synchronisation with the data output from the data distribution adjustment unit 112. With the configuration like this, in the combination output 201 format, data is output to the memory 108 through the bus interface unit 105 and the bus 106 in the mapping as indicated by the numeral 204 in FIG. 2.

In the case of the distribution output 202 format, the base address output from the base address generation unit 402 and the offset address, which is obtained by adding an offset value specified by the offset specifying unit 401 to the base address, are alternately selected and output by the selector 404 which serves as the first selector. As a result, addresses for two images are generated. For example, in the above-described example, for the output of the data {a1, a2, a3, a4}, a base address is output to the bus interface unit 105 in synchronization with that data. Further, for the output of the data {b1, b2, b3, b4}, an offset address, which is obtained by adding an offset value to the base address, is output to the bus interface unit 105 in synchronisation with that data. This alternation control is performed by the input output switch control unit 405. With the configuration like this, in the distribution output 202 format, data is output to the memory 108 through the bus interface unit 105 and the bus 106 in the mappings as indicated by the numerals 205 and 206 in FIG. 2.

This embodiment has been explained so far by using examples where the image processing apparatus 113 outputs two types of data for the distribution output 202. However, similar advantageous effects to those of this embodiment can be also achieved in cases where the number of output types is more than two by employing a similar configuration to that of this embodiment in which data output from the image processing unit 101 is combined and input to the output buffer 103, and after adjusting the output timing, the data is redistributed (or rearranged) or output as it is.

Further, even in the case where the number of data types output by the data distribution unit 104 is more than two, for example, in a case where there is one combined data and two divided data, the offset specifying unit 401 can generate two types of offset addresses by generating two types of offset values having different values, and thus making it possible to output a plurality of types of data by using a configuration substantially similar to that shown in FIG. 4.

Third Embodiment of the Invention

Next, a third embodiment according to the present invention is explained. In this embodiment, the configuration of the data distribution unit 104 in the second embodiment is modified. Note that the other configuration is similar to that of the second embodiment, and therefore its explanation is omitted.

In this embodiment, the buffers 4091 to 4096 in the second embodiment shown in FIG. 4 are used for both the combination output 201 format and the distribution output 202 format. By using the same buffers for both output formats, these buffers can be used as buffers for data distributions in the bus 106.

Figure 8:
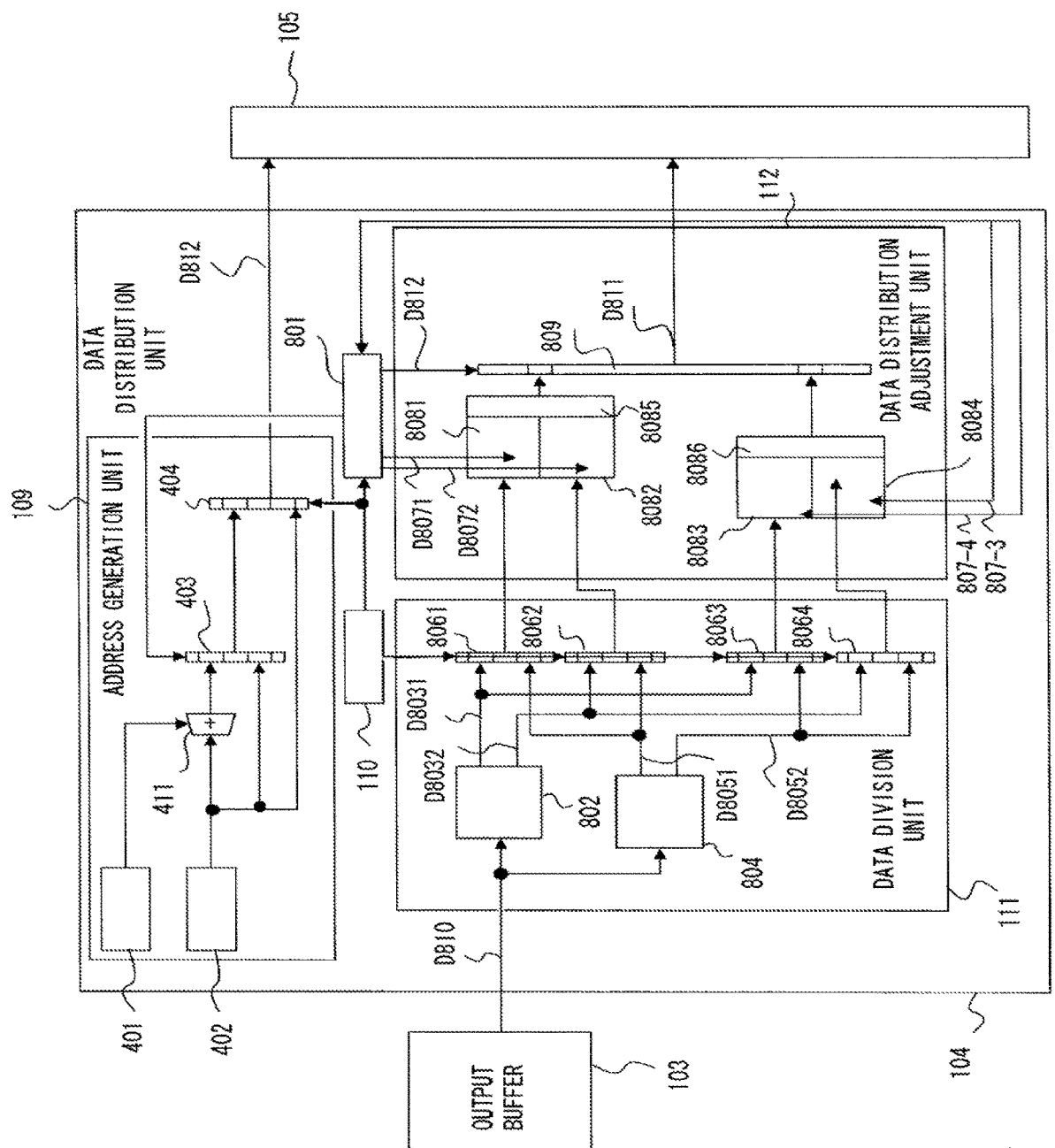
FIG. 8 shows details of a data distribution unit 104 according to a third embodiment of the present invention.
Figure 9:
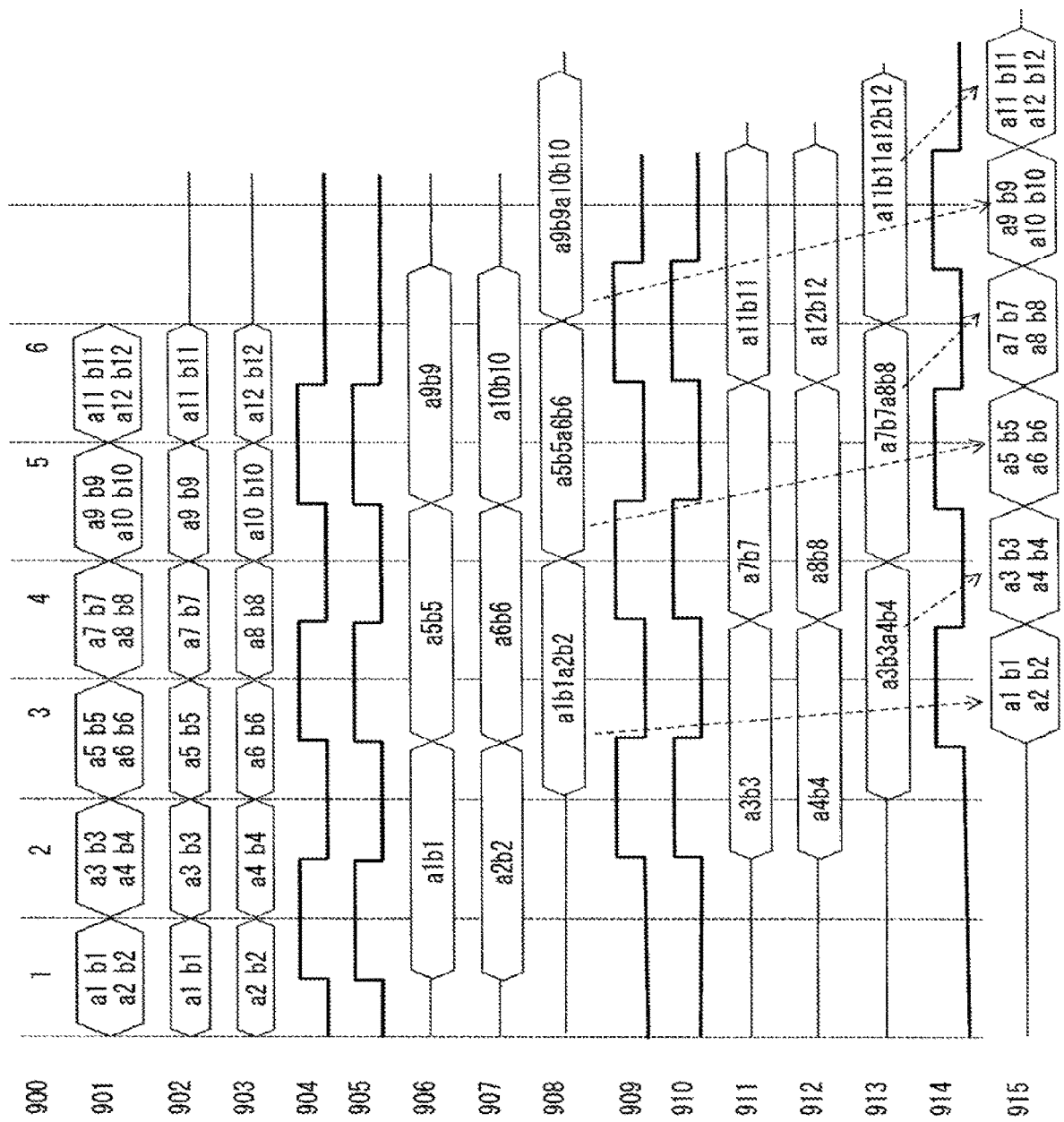
FIG. 9 is a timing chart showing signals in a data distribution unit 104 and a value of a buffer.

FIG. 8 shows details of the data distribution unit 104 according to this embodiment, and FIG. 9 is a timing chart showing signals and values of buffers in the data distribution unit 104. Similarly to the second embodiment shown in FIG. 4, as shown in FIG. 8, the data distribution unit 104 includes a data step division unit 804 (corresponding to the data step division unit 406 in the second embodiment) and an input output switch control unit 801 (corresponding to the input output switch control unit 405 in the second embodiment).

The configuration of the address generation unit 109 is similar to that of the second embodiment shown in FIG. 4.

In this embodiment, the data division unit 111 includes a data successive division unit 802. In the second embodiment, the data is output from the output buffer 103 as it is in the case of the combination output 201 format. In contrast, in this embodiment, the data output from the output buffer 103 is input to the data successive division unit 802.

Numerals 8061 to 8064 represents selectors each of which selects either the output of the data successive division unit 802 or the output of the data step division unit 804. In each of the selectors 8061 to 8064, the output format specifying signal supplied from the output format specifying unit 110 specifies the data to be selected. In the case of the combination output 201 format, the output of the data successive division unit 802 is selected and output. Further, in the case of the distribution output 202 format, the output from the data step division unit 804 is selected and output.

Buffers 8081 to 8084 correspond to the buffers 4091 to 4094 respectively shown in FIG. 4. Each of the buffers 8081 to 8084 has a capacity of 16 bits. Further, the data input/output for the buffers 8081 to 8084 is permitted by the input output switch control unit 801. When the setting of the output format specifying unit 110 is the distribution output 202, the similar control co that explained above with reference to FIG. 4 is performed. Further, signals D8071 to D8074 in this embodiment correspond to the signal D4081 to D4084 In the second embodiment. Further, buffers 8085 and 8086 in this embodiment correspond to the 32-bit buffers 4095 and 4096 in the second embodiment.

The operation of the selector 809 is also similar to that of the selector 410 explained above with reference to FIG. 4. Therefore, the timing chart in the distribution output 202 format is similar to that shown in FIG. 7. The following are a relation between each signal in the timing chart and that shown in FIG. 8:

701: signal D810 from output buffer 103;
702, 703: output D8051 and D8052 from data step division unit 804;
704, 705: signals D8071 and D8072 from input output, switch control unit 801 to buffers 8081 and 8082;
706, 707, 708: data held by buffers 8081, 8082 and 8085;
709, 710: signals D8073 and D8074 from input output switch control unit 801 to buffers 8083 and 8084;
711, 712, 713: data held by buffers 8083, 8084 and 8086;
714: signal D812 from input output switch control unit 801 to selector 809; and
715: data flowing through connection, line D811 from data distribution unit 104 to bus interface unit 105.

Next, a configuration for the combination output 201 format is explained. In the case of the combination output 201 format, the output of the date successive division unit 802 is used. For example, the data successive division unit 802 divides data received as {a1, b1, a2, b2} into data {a1, b1}, {a2, b2}, i.e., into the unit of the buffers 8081 to 8084 (16 bits) and sends out them to the buffers 8081 to 8084 (see 902 and 903). The successive division in this example means dividing the above-described data {a1, b1, a2, b2} according to its original data sequence.

In the case of the combination output 201 format, the sequence of write permission signals sent from the input output switch control unit 801 to the buffers 8081 to 8084 is different from that of the distribution output 202 format. Either the write permission signal for the pair of signals D8071 and D8072 or the write permission signal for the pair of signals D8073 and D8074 becomes a High level. That is, the data from the selectors 8061 to 8064 are simultaneously taken into either the pair of signals D8071 and D8072 or the pair of signals D8073 and D8074. The buffer 8085 holds data at the moment when tooth buffers 8081 and 8082 are updated. Further, the buffer 8086 holds data at the moment when both buffers 8083 and 8084 are updated.

FIG. 9 shows a timing chart for the combination output 201 format in this embodiment. The following are a relation between each signal or buffer value in FIG. 8 and that shown in FIG. 9:

900: time τ;
901: output signal D810 of output buffer 103;
902, 903: signals D8031 and D8032;
904, 905: signals D8071 and D8072;
909, 910; signals D8073 and D8074;
906, 907, 911 and 912: values held by buffers 8081, 8082, 8083 and 8084;
908, 913: values held by buffers 8085 and 8086;
914: signal D812 from; input output switch control unit 801 to selector 809; and
915: signal D811 output from selector 809.

Firstly, at a time τ=1, a signal {a1, b1, a2, b2} is sent out from the output buffer 103. The signal is divided into signals {a1, b1} and {a2, b2} by the data successive division unit 802, and they are output to the connection lines D8031 and D8032 (see 902 and 903) respectively.

The signal {a1, b1} is sent to the buffers 8081 and 8083. However, since only the signal D8071, among the signals D8071 and D8073 supplied from the input output switch control unit 801, is in a permission state (see 904 and 905), the signal {a1, b1} is written only in the buffer 8081 (see {a1, b1} of 906).

Similarly, the signal {a2, b3} is written only in the buffer 8082. The data in the buffers 8081 and 8082 are taken out and written into the buffer 8085 as 32-bit data {a1, b1, a2, b2} (see 908). In the timing chart indicated by the numeral 908 in FIG. 9, the writing to the buffer 8085 is not started at the moment when both buffers 8081 and 8082 are updated. However, this is only because this timing chart is drawn so that the write timing coincides with the timing of the distribution output 202 format shown in FIG. 7. Therefore, the writing can be started at the moment when both buffers are updated.

At a time τ=2, a signal {a3, b3, a4, b4} is sent out from the output buffer 103. The signal is also divided into signals {a3, b3} and {a4, b4} again in the data successive division unit 802, and they are sent out to the buffers 8081 to 8084. However, in this time, since the signal from the input output switch control unit 801 permits only the writing to the buffers 8083 and 8084, the values of the buffers 8083 and 8084 are updated (see 911 and 912).

After that, the content {a3, b3, a4, b4} of the buffers 8083 and 8084 is written into the 32-bit buffer 8086 (see 913). One of the data held in the buffers 8085 and 8086 is selected and output by the selector 809 under the control of the signal D812, and is output to the bus interface unit 105 through the connection line D811. A numeral 914 represents the signal D812 and a numeral 915 represents the data flowing through the connection line D811. When the signal D812 is in a raised state (at a High level), the selector 809 selects and outputs the data of the buffer 8085, whereas when the signal D812 is in a lowered state (at a low level), the selector 809 selects and outputs the data of the buffer 8086.

Similarly to the first embodiment, in this embodiment, when the image processing apparatus 113 calculates a plurality of image data for one image data, the plurality of calculation results are combined and input to the output buffer. By doing so, it is possible to minimize the increase of the number of output buffers as in the case of the first embodiment. Further, for example, the data distribution unit 14 may be disposed behind the output buffer so that the combined data may be distributed (divided). In such cases, means for dividing combined data, adjustment means for adjusting the data divided by the dividing means into the unit for the bus, and the like may be provided. Further, whether the combined data, is output or the divided data is output may be selected by a selector. Further, as for the address(es) for the combined data and the divided data, address generation means may be provided. For example, an offset address (es) is generated by giving an offset(s) to the base address, and the base address or the offset address is selected as appropriate, so that the combined data or the divided data can be easily generated.

Note that the configuration in which the image processing unit 101 outputs two types data is explained in this embodiment. However, for a case where the image processing unit 101 outputs three or more types of data or for a case where the number of the output(s) of the data combination unit 102 is one or more, the concept, of this application can foe also applied. By doing so, a configuration in which the output of the output buffer (s) 103, whose number is smaller than the number of outputs of the image processing unit 101, is received can be also employed based on a similar concept.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:
1. A semiconductor device comprising:
an image processor configured to execute first and second calculation processing for image data to output first and second processed data respectively, the first calculation processing being different from the second calculation processing; and
a data distribution circuitry configured to receive the first and second processed data, and to select one of a combination output format or a distribution output format to output the first and second processed data,
wherein, in the combination output format, the first and second processed data are combined, and
wherein, in the distribution output format, the first and second processed data are separated.
2. The semiconductor device according to claim 1,
wherein in the combination output format, the data distribution circuitry outputs the first and second processed data at a same timing, and
wherein, in the distribution output format, the data distribution circuitry outputs the first and second processed data at a different timing.
3. The semiconductor device according to claim 1, wherein the data distribution circuitry selects one of the combination output format or the distribution output format in response to a combination distribution instruction.
4. The semiconductor device according to claim 1, further comprising a data combination circuitry coupled between the image processor and the data distribution circuitry, and configured to combine the first and the second processed data to generate combined data, wherein the data distribution circuitry receives the first and second processed data as the combined data, wherein, in the combination output format, the data distribution circuitry outputs the first and second processed data as the combined data, and wherein, in the distribution output format, the data distribution circuitry divides the combined data into the first and second processed data to output the first and second processed data.

5. The semiconductor device according to claim 4, further comprising a buffer circuitry coupled between the data combination circuitry and the data distribution circuitry, and configured to store the combined data, wherein the data distribution circuitry receives the combined data from the buffer circuitry.

6. The semiconductor device according to claim 5, further comprising a bus interface coupled to the buffer circuitry and the data distribution circuitry, wherein the buffer circuitry adjusts an output timing of the combined data in accordance with a transmission permission signal supplied from the bus interface.

7. The semiconductor device according to claim 1, further comprising:

a bus coupled to the data distribution circuitry; and a memory interface coupled to the bus and configured to be connectable to a memory, wherein the first and second processed data output from the data distribution circuitry in the combination output format are stored adjacently to each other into the memory, and wherein the first and second processed data output from the data distribution circuitry in the distribution output format are stored apart from each other into the memory.

8. The semiconductor device according to claim 4, wherein the data distribution circuitry includes:

a data division circuitry configured to divide the combined data to generate the first and second processed data; and a select circuitry configured to select one of the combined data or the first and second processed data generated by the data division circuitry.

9. The semiconductor device according to claim 4, wherein the data distribution circuitry includes an address generation circuitry configured to generate one of a first address signal or a second and third address signals, wherein, in the combination output format, the data distribution circuitry outputs the first address signal, and wherein, in the distribution output format, the data distribution circuitry outputs the second and third address signals.

10. The semiconductor device according to claim 9, wherein the address generation circuitry includes:

a base address generation circuitry configured to generate a base address; and an offset providing circuitry configured to provide an offset to the base address, wherein the first and second address signals are generated based on the base address, and wherein the third address signal is generated based on an offset address obtained by providing the offset to the base address.

* * * * *